United States Patent [19]

Robertson et al.

[11] Patent Number: 5,667,376
[45] Date of Patent: *Sep. 16, 1997

[54] ULTRA LOW NOX BURNER

[75] Inventors: Thomas F. Robertson, Cleveland; Todd A. Miller, Garfield Heights; Dennis E. Quinn, Hinckley, all of Ohio

[73] Assignee: North American Manufacturing Company, Cleveland, Ohio

[*] Notice: The term of this patent shall not extend beyond the expiration date of Pat. No. 5,407,345.

[21] Appl. No.: 309,198

[22] Filed: Sep. 20, 1994

Related U.S. Application Data

[63] Continuation-in-part of Ser. No. 44,719, Apr. 12, 1993, Pat. No. 5,407,345.

[51] Int. Cl.$^6$ .................................................. F23L 9/00
[52] U.S. Cl. ................. 431/115; 431/181; 431/278; 431/285; 431/353
[58] Field of Search .................... 431/115, 116, 431/9, 181, 187, 352, 353, 354, 158, 278

[56] References Cited

U.S. PATENT DOCUMENTS

| | | |
|---|---|---|
| 2,515,845 | 7/1950 | van den Bussche . |
| 3,265,114 | 8/1966 | Childree ........................... 431/354 |
| 3,990,831 | 11/1976 | Syska . |
| 4,004,875 | 1/1977 | Zink et al. . |
| 4,105,393 | 8/1978 | Boylett ............................ 431/116 |
| 4,378,205 | 3/1983 | Anderson . |
| 4,445,842 | 5/1984 | Syska . |
| 4,496,306 | 1/1985 | Okigami et al. . |
| 4,629,413 | 12/1986 | Michelson et al. . |
| 4,945,841 | 8/1990 | Nakamachi et al. . |
| 5,135,387 | 8/1992 | Martin et al. . |
| 5,139,416 | 8/1992 | Wagner et al. ................. 431/354 |
| 5,154,599 | 10/1992 | Wunning . |
| 5,195,884 | 3/1993 | Schwartz et al. . |
| 5,201,650 | 4/1993 | Johnson . |
| 5,263,849 | 11/1993 | Irwin et al. . |
| 5,310,337 | 5/1994 | Lifshits et al. . |
| 5,407,345 | 4/1995 | Robertson et al. ............. 431/115 |

FOREIGN PATENT DOCUMENTS

| | | | |
|---|---|---|---|
| 1178087 | 5/1959 | France | ............... 431/187 |
| 1 557 574 | 1/1969 | France . | |
| 2 012 414 | 7/1979 | United Kingdom . | |
| 2 054 882 | 2/1981 | United Kingdom . | |

*Primary Examiner*—James C. Yeung
*Attorney, Agent, or Firm*—Jones, Day, Reavis & Pogue

[57] ABSTRACT

A burner is disclosed having a burner chamber with heavily insulated heat retaining walls and a series of off-center mixers located at one end thereof. A uniform concentration gas/air mixture to 50% additional fuel above the lean flammability limit coming from the mixer tubes is ignited in the burner chamber due to the recirculation of combusting gas and air back to the end of the burner chamber above auto the ignition temperature for the mixture. The particular mixture disclosed utilizes 0.55–0.7 equivalence ratio. With the present burner, oxidant and fuel are respectively supplied to each mixer by respective common oxidant and fuel plenums. In this way, fuel and oxidant are mixed near the point of combustion, enhancing safety and permitting the construction of larger burners.

17 Claims, 7 Drawing Sheets

5,667,376

1

ULTRA LOW NOX BURNER

CROSS REFERENCE TO RELATED APPLICATIONS

This is a continuation-in-part of application Ser. No. 08/044,719 filed on Apr. 12, 1993, U.S. Pat. No. 5,407,345.

FIELD OF THE INVENTION

This invention relates to lowering NOX in industrial burner systems.

BACKGROUND OF THE INVENTION

Nitrogen oxide compounds (NOX) are typically formed during combustion processes which entail high temperatures and other factors which make possible the chemical combination of nitrogen and oxygen. NOX is shown to be an irritant in small quantities and a potentially greater threat to human life in large quantities. NOX is also suspected of being a significant source of pollution to the environment. In industrial burner systems, particularly those of the type that operate above one million BTU's per hour with flame temperatures approaching 3500° F., localized production of NOX can be prodigious.

Increasingly, environmental protection agencies and state governments are tightening down on the pollutants which are discharged from burner systems including those used in industrial furnaces. As these limits are reduced, including those for NOX and CO, it becomes more difficult for burner manufacturers and operators to meet these pollution standards.

In a conventional premix burner system, it is common to mix fuel and oxidant remote from the site of combustion in order to create a premix, which is then flowed to the burner. In the event of flashback, the quantity of premix downstream of the mixing site may potentially combust resulting in a detonation wave traveling backward from the combustion site. Such flashback poses a great safety risk to personnel and destructive potential to equipment. For this reason, such burner systems are typically limited to a premix firing rate on the order of ten million BTU's per hour.

In prior premix systems, noise and vibration increase as the fuel to oxidant ratio approaches stoichiometric. A coupling between the external heat transfer rate and the intrinsic reaction rate of a fully premixed mixture can occur. This phenomenon is referred to as a Rayleigh oscillation. It is responsible for the "motor boating" sound often heard when pilots are fired through long tubes. While this phenomenon is not a problem in itself, this oscillation can match the natural frequencies in a particular firing chamber or room. When this happens, the two bootstrap each other into a much louder and more violent sound or vibration. Such vibration also has potentially destructive consequences.

SUMMARY OF THE INVENTION

The present invention overcomes the problems associated with prior systems. The present invention is directed to a burner system for combusting fuel with an oxidant. The burner includes a mixer for mixing fuel and oxidant in a predetermined proportion. The mixer includes a mixer inlet with a fuel input and an oxidant input for respectively admitting fuel and oxidant into the mixer. The mixer also includes a mixer outlet for discharging the mixed fuel and oxidant. Combustion occurs at or near the mixer outlet.

The mixer can be one of several mixer tubes, each of which includes respective fuel and oxidant inputs. The fuel inputs are each connected to a common fuel plenum, which supplies fuel to each mixer. Similarly, each oxidant input is connected to a common oxidant plenum, which respectively supplies oxidant to each mixer. With the present invention, the mixing is done within the burner itself, and in this manner, the risk of danger due to flashback is minimized. With this arrangement, larger burners can be constructed, which can safely combust upwards of 200 million BTU's per hour.

The present invention can also be contemplated as including plural mixer tubes mounted with their mixer outlets defining an inlet to a reaction chamber. The mixer tubes are mounted off-center about the chamber axis. By arranging the mixers in this manner, part of the combusted mixed fuel and oxidant is recirculated within the chamber in order to ignite the fuel and oxidant mix entering the chamber from the mixer outlets. In this way, an environment of uniform flame temperature is created, substantially inhibiting NOX production. The reaction chamber may also include a tapered outlet section which further promotes recirculation within the chamber by restricting the flow outward from the chamber, further lowering flame temperature and thus, NOX production.

Therefore, it is an object of this invention to lower the pollutants produced by burner systems.

It is an object of this invention to improve the efficiency and temperature uniformity of combustion of burner systems.

It is an object of this invention to reduce or eliminate flashback in burner systems and thereby improve safety.

It is an object of this invention to produce a burner having low NOX and CO outputs.

It is an object of this invention to avoid the use of external gas mix plenums in low pollution burner systems.

It is an object of this invention to improve the temperature uniformity produced by burner systems.

Other objects and a more complete understanding of the invention may be had by referring to the following description and drawings in which:

DESCRIPTION OF THE PREFERRED EMBODIMENT

Figure 1:
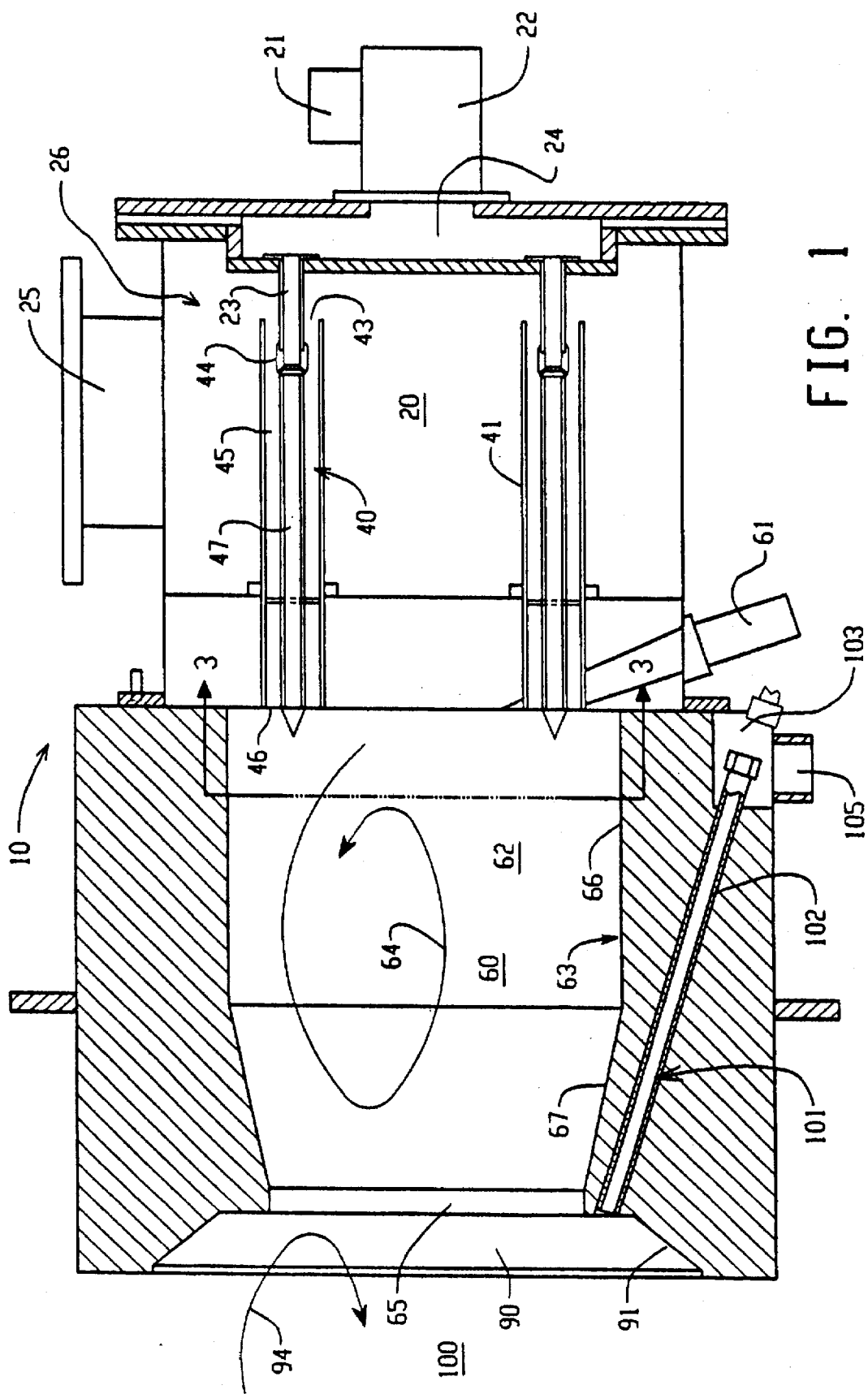
FIG. 1 is a longitudinal cross sectional view of a burner system incorporating the invention of the application.
Figure 2:
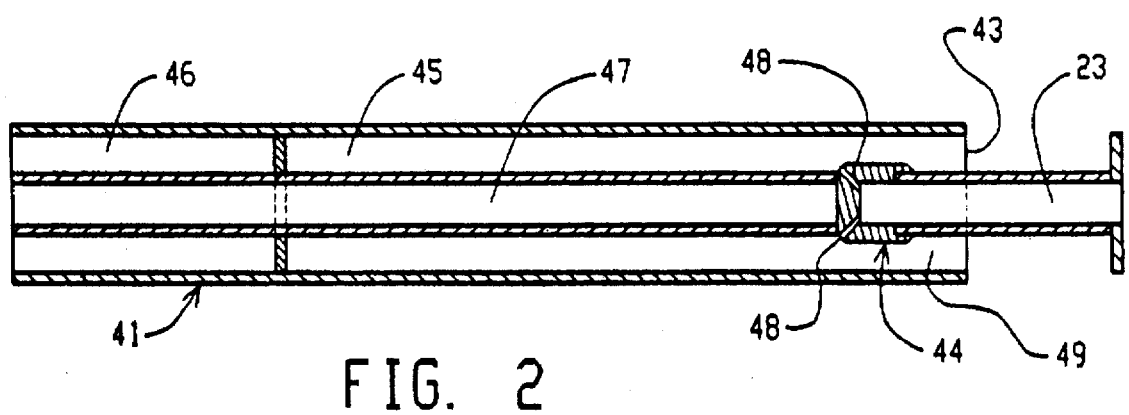
FIG. 2 is an enlarged partial cross sectional view of the mixer tube of the preferred embodiment of FIG. 1.
Figure 3:
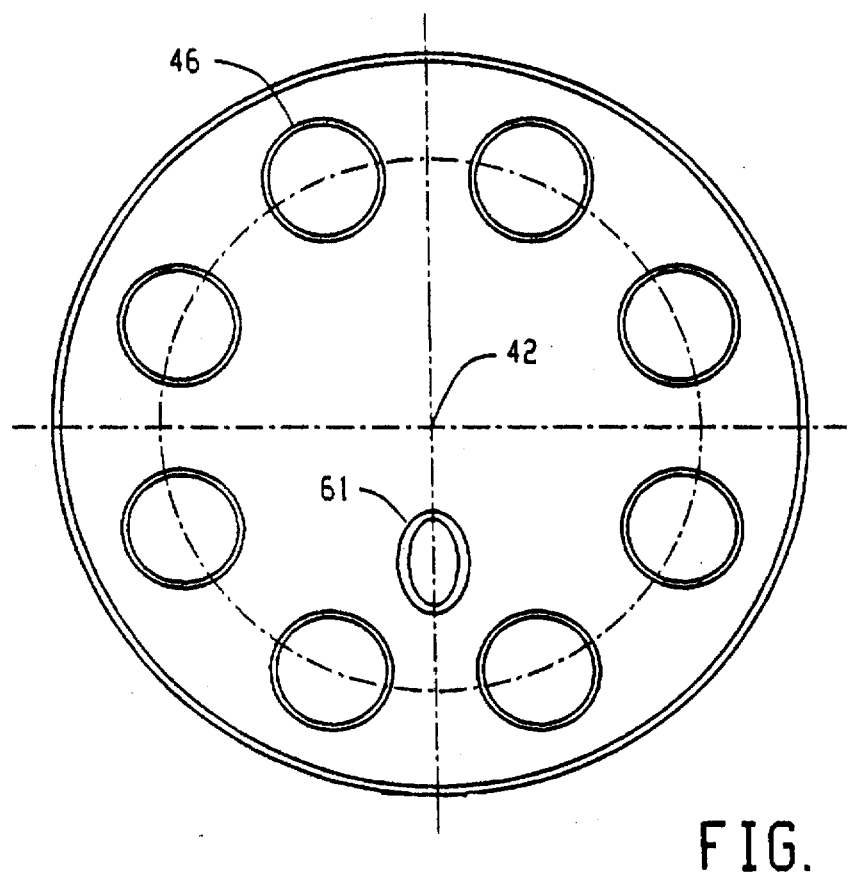
FIG. 3 is an end view of the mixer taken generally along the lines 3—3 of FIG. 1.

The disclosed design of the ultra low NOX partial premix burner consists of two modules, a mixer section and a reaction chamber/bypass gas section. The mixer section supplies a highly uniform premix near to the flammability limits to the reaction chamber, preferably with an equivalence ratio between 0.55 and 0.7, for natural gas as fuel and air as the oxidant. When combusted, these lean mixtures produce extremely low NOX emissions. The reaction chamber/bypass gas section provides a location for premix combustion, a means of decreasing overall system excess air, and flame shaping capabilities. On many applications this will be the final embodiment of the burner, however, certain specific applications may require a slightly different configuration.

The burner system 10 includes a plenum section 20, a mixing section 40, a primary burner section 60, a flame modifying section 90, and a secondary flame section 100.

The plenum section 20 is for interconnection of the burner system 10 to the supplies for fuel and oxidant for the burner.

The fuel input 21 in the preferred embodiment disclosed is fed through a fuel connection 22 to a plenum 24 in the mixing section 40 (later described). The fuel plenum 24 serves to distribute the incoming fuel stream uniformly between individual mixer elements. This even distribution is essential to guarantee that a high quality, uniform premix is obtained by the initial mixer section at the levels later described.

In the preferred embodiment disclosed, the fuel input at this location is from 940–1200 cubic feet per hour of natural gas at the standard 14" water column pressure at 70° F. Other gaseous fuels including propane, propane/air, butane, etc. and vaporized liquids such as oil, etc. may be fired in this style of burner.

The oxidant input 25 is a source of pressurized oxidant for the burner system 10. This oxidant input 25 is directly interconnected to the plenum 26, which oxidant plenum in turn surrounds the mixing section 40 (later described). The oxidant plenum serves to distribute the incoming stream uniformly between individual mixer elements. This even distribution is essential to guarantee that a high quality, uniform premix is obtained by the initial mixer section.

In that the oxidant plenum 26 is isolated from the fuel plenum 22, there is no mixing of fuel and oxidant in the plenum section 20. This avoids the explosion potential which is present if oxidant and fuel are present in a plenum or tube which is located separately from the area of actual combustion. By mixing fuel and oxidant within the mixer, near the point of combustion, safety is greatly enhanced, thereby permitting the construction of larger burners, with combustion capabilities of upwards of 200 million BTU's per hour.

In the preferred embodiment disclosed, the oxidant is air with standard 21% oxygen and 16000 cubic feet per hour at 70° F. In the preferred embodiment disclosed, the air pressure within the air plenum 26 is 10" water column.

Note that if the air input 25 is at a different temperature than the 70° F. described or at a different oxygen content, the volume of fuel input can be reduced or increased as necessary in order to maintain the proper ratio for the primary burner section 60 (later described), particularly in respect to the lean flammability limit. The most common way for the oxidant input 25 to be at a different temperature would be if the incoming oxidant was preheated prior to being mixed with the fuel. This could be occasioned by the use of a recuperator, as for example item 300 in FIG. 5 which is interconnected between the furnace and the stack 301, by a regenerator, or a secondary burner in the air input lines, or otherwise as desired. Preferably the change from ambient oxidant to preheated oxidant would be accompanied by two changes to the primary burner module. First, as the inlet oxidant temperature is raised, a corresponding increase in the reaction chamber temperature will occur. To maintain minimum NOX levels, this increase in oxidant temperature would be offset by a corresponding decrease in the primary zone equivalence ratio. Additionally, a refractory lining would be added to the module to maintain a low burner shell temperature. If 1000° F., 21% $O_2$ preheated air is furnished to the burner for example, the primary zone equivalence ratio would preferably be lowered to 0.445 from 0.65 for ambient air. Bypass gas passages and the reaction chamber exit diameter may also have to be modified for optimum burner performance. It is preferred that the temperature preheating means raise the temperature of the mixture fed to the burner section with a temperature increase below the ignition temperature of the fuel/oxygen mixture (i.e. normally on the range of 1200° F.). This would reduce the risk of premature ignition at a location other than the burner chamber 60.

Note that increasing the oxygen content of the combustion oxidant such as air also will raise the primary zone adiabatic flame temperature. Similar to preheated oxidant, this increase in flame temperature would be compensated for by a decrease in primary zone equivalence ratio.

The mixing section 40 is designed to provide a uniform concentration of mixed oxidant and fuel at a uniform velocity at the head end of the burner section 60 (i.e. at the ends of both individual mixing tubes) and between individual mixing tubes. It is also designed to avoid the potential for flashback into the mixer and into the chamber. The output of the mixing section is a uniform fuel oxidant mixture having a ratio from the lean flammability limit to 50% excess fuel from this lower limit. The flammability ratio is described in *Combustion Theory* by Forman A. Williams (also incorporated page 266 for example). This limit is set forth as:

"Flammability limits are limits of composition or pressure beyond which a fuel oxidizer mixture cannot be made to burn".

The flammability limit is a complex function of fuel composition, oxidant composition, mixture pressure, and mixture temperature which cannot always be readily calculated. It is the intent of this invention that the primary combustion zone equivalence ratio be maintained as close as possible to the flammability limit on either side thereof, allowing for reasonable ratio control. For this reason, an operating range for the primary zone equivalence ratio is specified as being between the flammability limit and the midpoint of the flammability limit and stoichiometric ratio. This provides for reasonable control of the burner system through a variety of firing rates.

The mixing section 40 accomplishes the intimate mixing of both primary fuel and oxidant streams such that the resultant mixture has a high degree of uniformity. When the mixers are properly spaced at the entrance to the reaction chamber, the ensuing reacted mixture has only minimal NOX levels. Typical mixture ratios and NOX levels are as follows:

| Equivalence Ratio | NOX Emissions |
|---|---|
| .55 | 2.9 ppm v at 3% $O_2$ |
| .60 | 4.3 ppm v at 3% $O_2$ |
| .65 | 6.6 ppm v at 3% $O_2$ |
| .70 | 10.8 ppm v at 3% $O_2$ |

The equivalence ratio generally is the fuel air ratio divided by the stoichiometric fuel air ratio.

In a preferred embodiment of the invention, the mixing section 40 includes a series of eight tubes 41 extending in a circle spaced from the central axis 42 of the burner system 10. Each mixer tube 41 of this embodiment includes an intake 43, an inspirator 44, a mixer 45, and a discharge 46. All of the mixer tubes are fed from a common fuel plenum 24 and a common oxidant plenum 26. This avoids the necessity of multiple plenums or interconnections.

Figure 7:
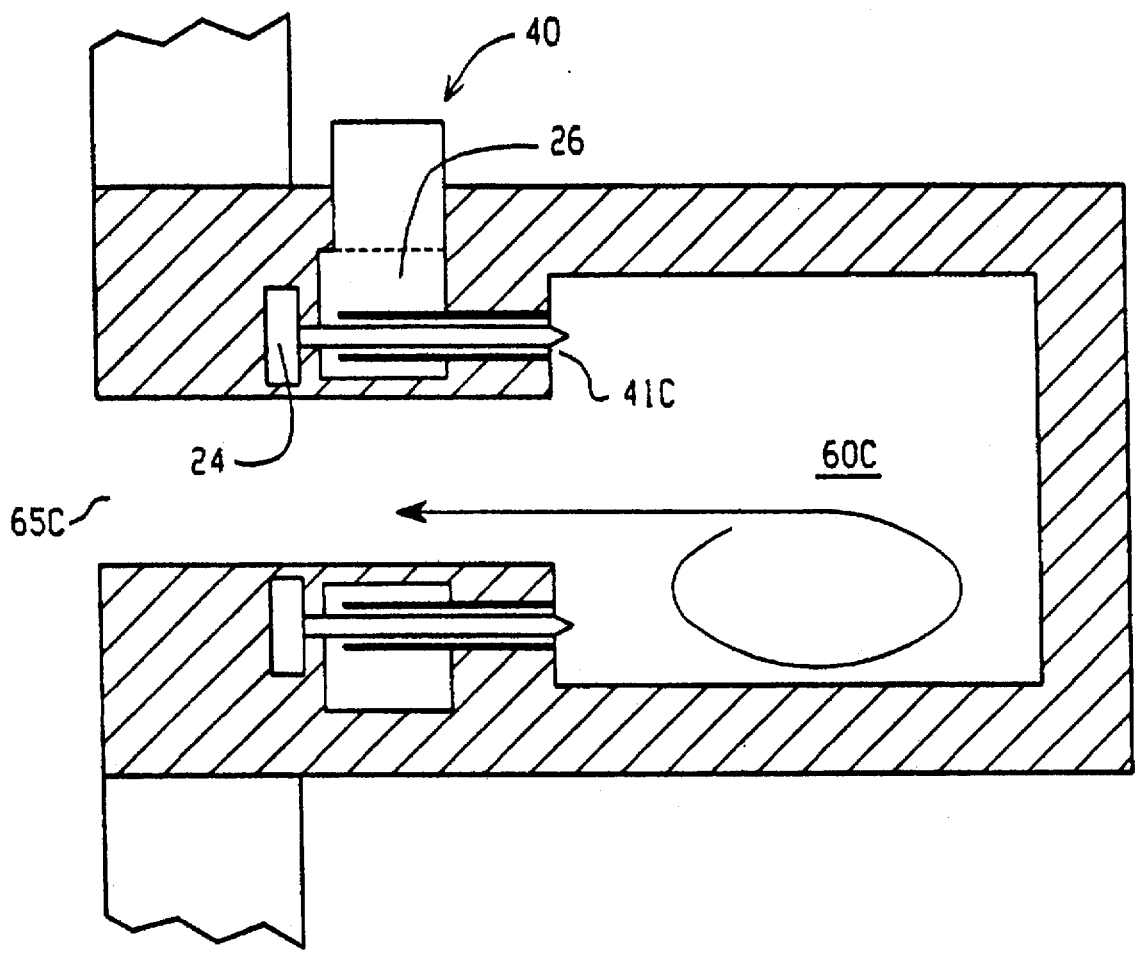

The preferred mixers 41 are placed on a common bolt circle with sufficient spacing both between individual mixer exits and between the collective mixer exits radius and the circle center to provide high levels of recirculation. The preferred mixing section 40 of FIG. 1 further provides a flow imbalance so as to cause a reverse flow or recirculation within the later described primary burner section 60. This pulls heat back to the face of the location of input of the incoming fuel oxidant mixture to facilitate ignition and uniform burning (later described). In the preferred embodiment shown, this location is the discharge of the mixing section 40 at the inlet of the primary burner section 60 with the recirculation primarily due to the arrangement of the later described mixing tubes 41 within the mixing section 40. The location of discharge could be relocated (even, for example, to near the outlet of the primary burner section as in FIG. 7) with other methods of recirculation to draw the heat back to the discharge. The reason for this is the desirability of drawing heat back to the discharge is more important than the location of the discharge or the cause of the recirculation, which drawing heat back promotes auto ignition and assists in combustion stability of the lean mixtures. As set forth, other types of mixers, locations, and recirculation means could also be used.

The intake 43 of the mixer tubes 41 is fed directly from the oxidant plenum 26. Oxidant such as air thus passes freely through these intakes 43.

An entrance section 49 is located between the intake 43 and the inspirator 44. This section 49 serves to straighten the incoming oxidant flow and spread it uniformly throughout the mixer tube 41 annulus. The inspirator 44 itself includes a series of holes 48 extending through tubes 23 to the primary fuel plenum 24. The inspirator 44 thus utilizes a high fuel exit velocity through holes 48 to uniformly draw an oxidant through the entrance section 44 from the intake 43. Intimate mixing of the fuel and oxidant occur downstream in the mixing section 45.

Figure 8:
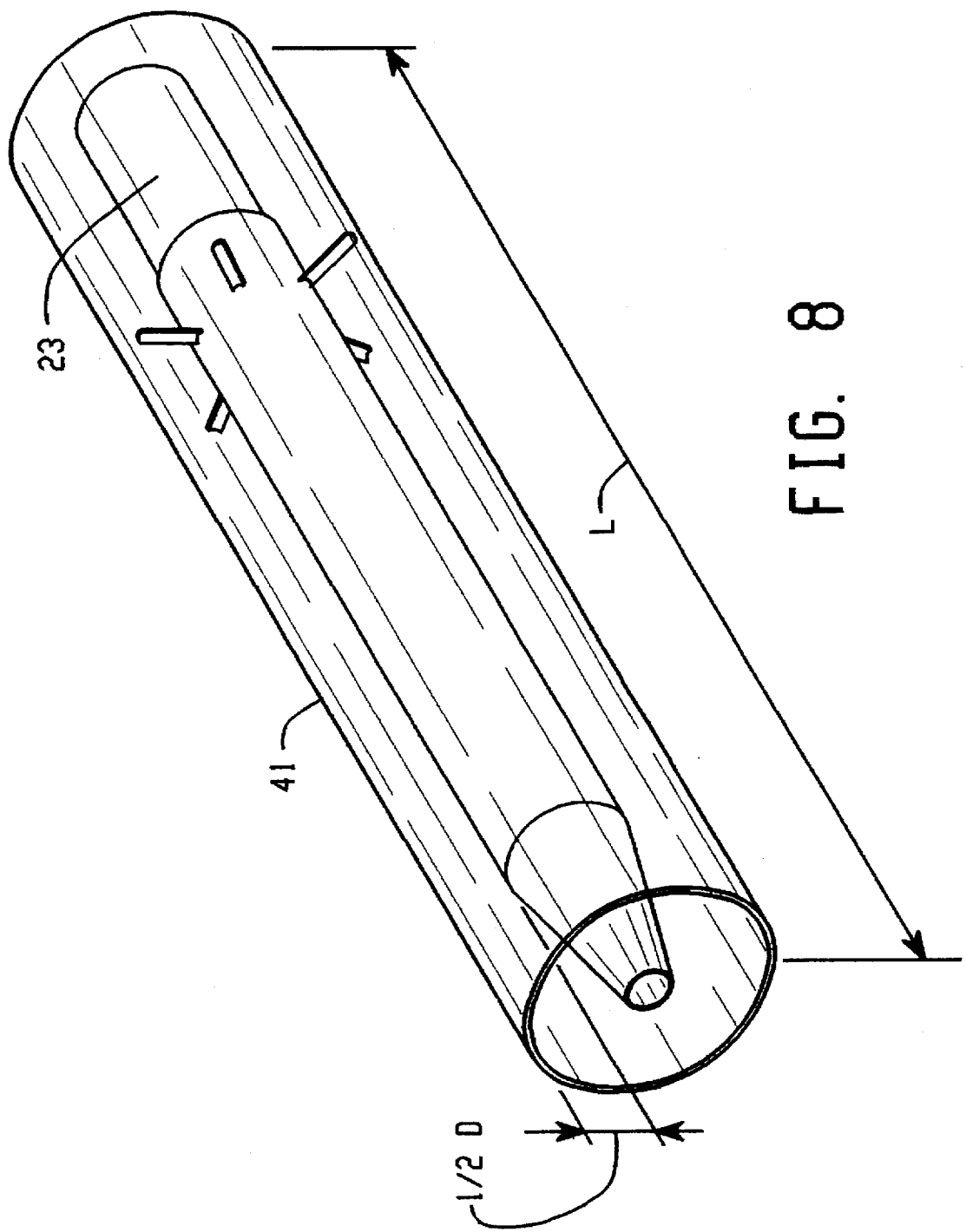
FIG. 8 is an oblique view illustrating the mixing tube according to an alternate embodiment of the present invention.

The annular passageway of the mixing section 45 serves two purposes. First, as seen in FIG. 8, the central part of the mixing section 45 is obstructed, and so the width of the fluid passage (and thus, the effective diameter of the mixer section 45) is made smaller. The half-diameter of the flow passage is measured between the tube 23 and the mixer tube 41. In this way, the annular passageway increases mixer tube 41 length to diameter ratio (L/D ratio). In the preferred embodiment, the L/D ratio is about 12. This proportion has been found to be effective in accomplishing complete mixing of the fuel and oxidant in the shortest possible distance. The annular shape, also provides mixer flashback prevention by increasing the flow velocity and maintaining passage sizes below the quenching diameter for the given mixture. In the preferred embodiment disclosed, the velocity through the mixing section 45 is approximately 140 ft/s.

The mixing section 45 of each mixer tube 41 serves to combine the fuel and oxidant to provide a uniform concentration mix of the two at a uniform velocity. This is not only within any individual mixer tube 41, but is also true between various separate mixer tubes 41.

In the preferred embodiment, each mixer tube 41 is a tube some 2" in diameter having a 11" total length. The entrance section 49 has a diameter of some 1.25" with the eight holes 48 for each mixer tube having a 0.9375" diameter section spaced 60° from each other.

Figure 9:
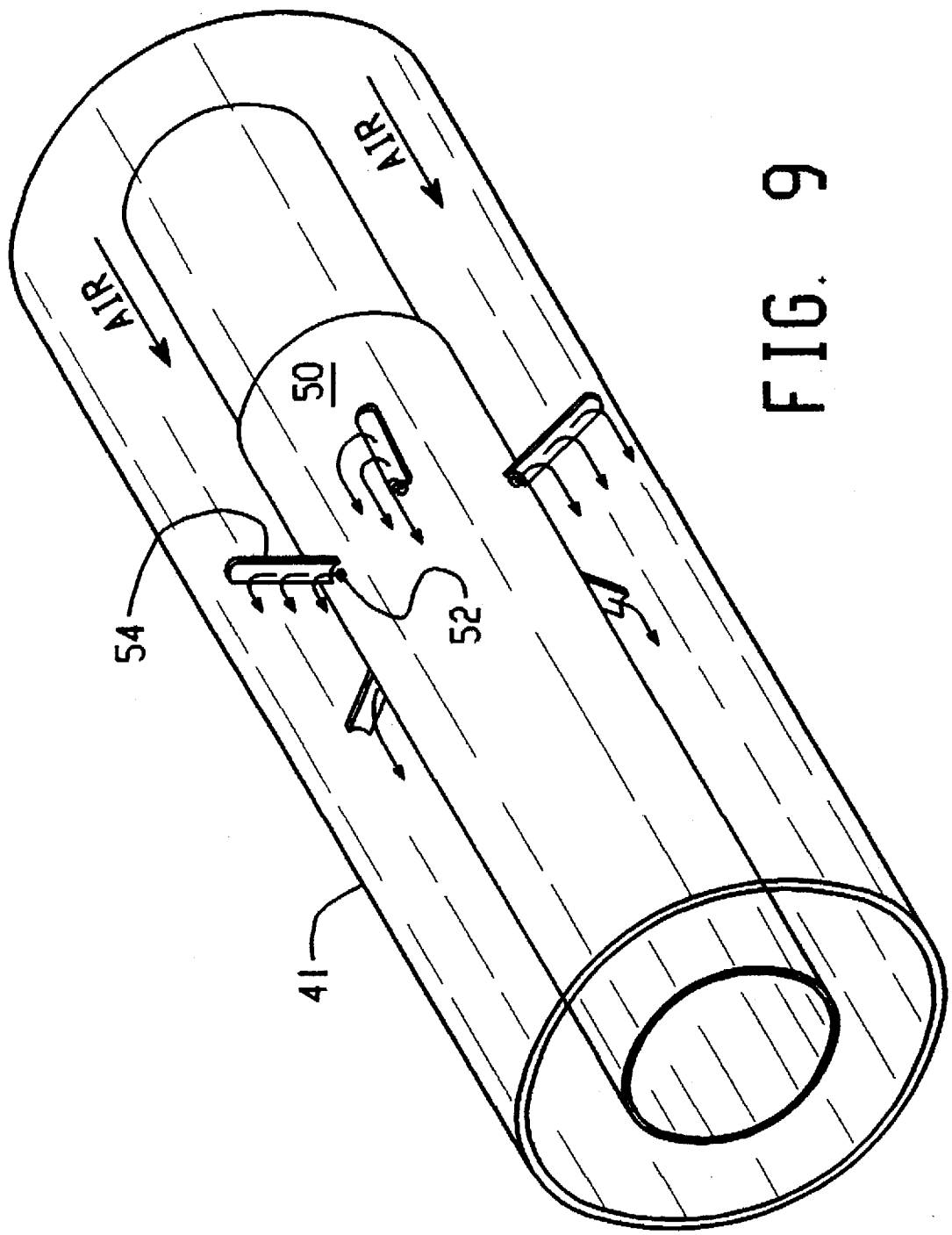
FIG. 9 is a detail view showing the operation of the mixing tube of the alternate embodiment.

In an alternative embodiment, shown in FIG. 9, the mixer section 45 includes a gas nozzle 50, mounted within the mixer tube 41, to distribute the gas evenly. The gas nozzle 50 includes a plurality of holes 52 which are each designed to admit fuel into the annular passageway. In this embodiment, the air is supplied at preferably a 10" water column pressure. The fuel is supplied at a lower pressure than the oxidant, preferably a 4–5" water column pressure. In order to insure that the fuel will enter the passageway at such a low pressure, a plurality of substantially hollow half-cylinder troughs 54 are respectively placed next to the holes 54, slightly upstream, so as to shield the holes and thereby create a zone of low pressure within the flow path behind the troughs 54. In this way, the low pressure fuel is permitted to enter the annular passageway. With this configuration, the troughs 54 present obstructions to the air flow, which additionally creates turbulence sufficient for substantially mixing the gas with the air. With this embodiment, the entire nozzle section 50 is friction fitted within the mixer tube 41. Such a friction fit permits secure retention of the nozzle 50 and also easy removal for maintenance.

Figure 5:
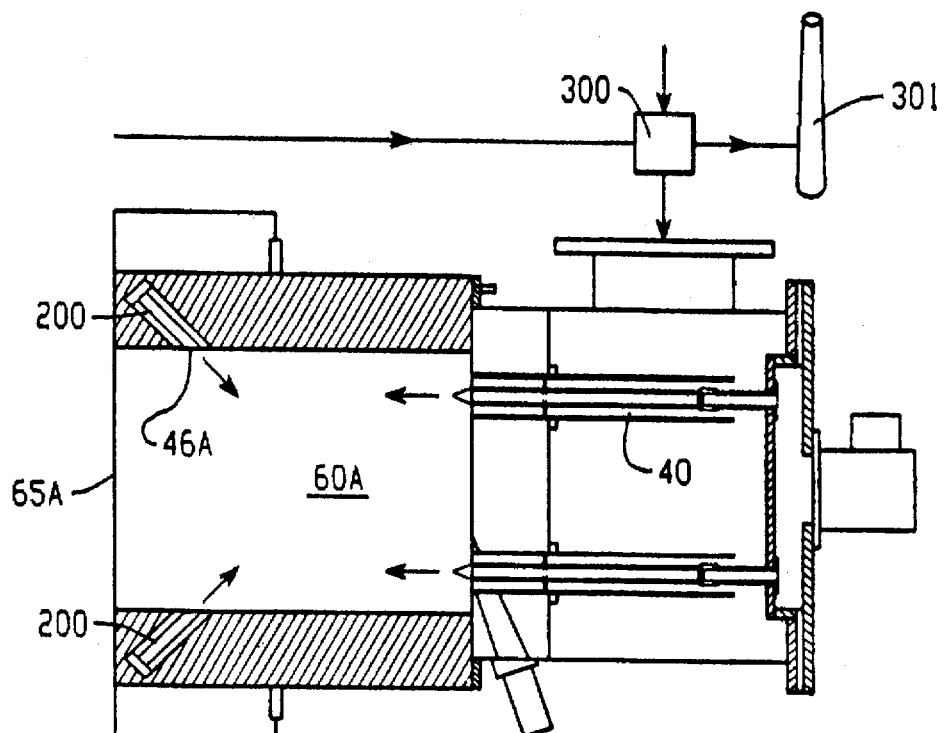
Figure 6:
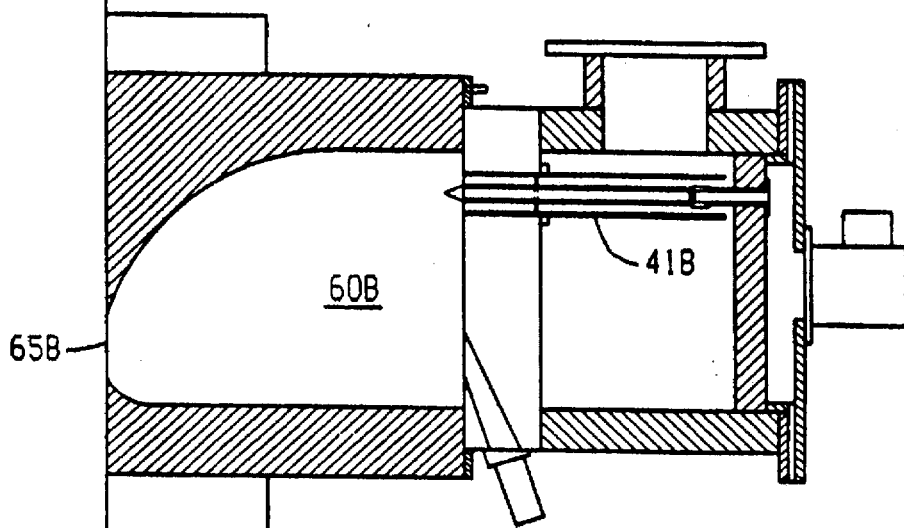

The discharge 46 from the mixing section 40 is directly into the primary burner section 60. In the preferred embodiment, in order to provide a reverse recirculation flow to pull heat back to the mixer, the location of the discharges 46 of the mixer tubes 41 are at the inlet to the primary burner section 60, and selected to provide for a recirculating flow imbalance within the reaction chamber. In the preferred embodiment, this is provided by locating the discharge 46 of the mixing tubes 41 off-center a significant distance from the axis 42 of the burner system 10. This provides the necessary flow imbalance in the primary burner section 60 in order to recirculate hot gases and thus draw heat back to the discharges 46 of the mixer. This facilitates the operation of the burner by auto igniting the fuel and oxidant and providing for uniform combustion temperatures. The mixing section 40 thus serves to stabilize the combustion in the primary burner section 60 as well as aiding in the recirculation flow in such primary burner section 60. The discharges from each mixer tube 41 also have a location in respect to the surrounding walls 63 of the primary burner section 60. The location is preferably selected to provide for a slight eddy type backflow recirculation along the walls 63. This would aid in the auto ignition without unduly subjecting the walls 63 to high temperatures or creating wall temperature losses (which one wants to minimize). The net effect of the recirculation within the primary burner section 60 is that a flow of combusting materials having a temperature above the ignition temperature of the incoming fuel oxidant mixture exists, which flow passes to the location of input of such incoming fuel oxidant mixture. Auto ignition therefore will occur, outlet volumes, wall losses, and other factors notwithstanding. This ignition means is self sustaining (although possibly after the inclusion of supplementation by a pilot 61, the burner walls 63 or other heat storage/additive device). Note again that other mixer designs and locations may be utilized. For example, in certain applications, smaller burner designs in particular, one integral mixer feeding several mixer ports through an intermediate plenum and/or piping could be utilized, the ports on the same pattern as individual mixers on other, normally larger burners. Other designs could also be utilized to provide the described uniform fuel oxidant mix. Other recirculation means could also be utilized in order to draw the heat back to the discharge of the mixing section. Two examples are shown in FIGS. 5 and 6. In FIG. 5, a secondary mixer assembly 200 is located near the outlet 65A of the primary burner section 60A with the tube discharge 46A of the secondary mixer assembly 200 being directed generally towards the inlet of such burner section 60A. This reverse direction discharge recirculates the combusting fuel oxidant mixture within the burner section 60A. By varying the fuel oxidant ratio between the main mixer 40 and secondary mixer 200, fuel or oxidant staging could be provided. In addition, flue gas could also be utilized in this secondary mixer assembly 200. In FIG. 6, the mixer tubes 41B are located asymmetrically in respect to a revised burner section 60B having a conical shape designed to aggressively promote recirculation during combustion.

The recirculation of combusting fuel and oxidant within the primary burner section 60, however it is provided, provides auto ignition and combustion of the uniform fuel oxidant mixture coming from the discharges 46 of the mixer tubes 41 by drawing heat to such discharge at a temperature above the ignition temperature of the fuel oxidant mixture. This aids in the complete combustion of the fuel oxidant mixture, something important at or near the described lean flammability ratios utilized in this burner.

In order to diminish the vibration associated with Rayleigh oscillation, it is necessary to sufficiently dampen the system so that the amplitude of the resonant frequencies does not get too large. A high pressure blower, preferably with pressures greater than or equal to 16 osi (ounces per square inch), provides a high level of dampening by supplying a consistent non-pulsating source of air.

The primary burner section 60 is the area in which virtually all of the primary combustion for the burner system 10 occurs. The preferred primary burner section 60 disclosed is designed to have a heat retentive insulated wall with a thermal characteristic to assist in maintaining an even temperature within the primary burner section 60. In the preferred embodiment, the walls 63 of the chamber 60 also have a thermal mass to assist in maintaining a temperature above the flammability limit and more particularly the ignition temperature of the described gas/air mixture. While this thermal mass could also be designed to have properties, such as a mass, sufficient to be used by itself to ignite the fuel oxidant mixture in the reaction chamber, it is preferred that some other ignition means be utilized, in the preferred embodiment primarily recirculation of combusting gases. The reason for this is a combination of the desire to have a compact burner (high thermal mass walls add size and insulation demands) as well as tightening down control of the burner (high thermal mass walls operate differently on cold start up than on hot running for example).

The entrance diameter of the inlet of the primary burner section is designed to provide a low velocity eddy recirculation of combusting products back to the input fuel and oxidant mix to develop and sustain ignition (the mix is also thermally stabilized via the wall heat transfer). The preferred primary burner section 60 accomplishes ignition on start up by actuating a pilot burner 61 to provide a heat source having the necessary ignition temperature (and also possibly enriching the mixture with extra fuel to assist in the initial ignition). The location of the pilot 61 near the axis 42 of the burner facilitates uniform ignition. After recirculation of combusting gases back to the inlet is well established to sustain the combustion, the pilot 61 is preferably turned off. At this time (about 20 seconds for a cold start up), the burner chamber recirculation 64 set up by the location of the mixer tubes 41 in the preferred embodiment serves to maintain a very stable burn in the primary burner section 60. The heat from the walls 63 of the primary burner section 60 aids in maintaining the combustion within the primary burner section 60. Optionally, the pilot 61 can be used for ignition on start up and then backed down to a lean burn to assist in the continued ignition of the fuel oxidant mixture or otherwise modified as desired. Although the pilot can be included as a start up, then optional supplemental ignition means for the burner during operation, other sources of heat, for example glow wires, could be utilized.

The particular burner section 60 shown includes a reaction chamber 62, a surrounding wall 63, an inlet and an outlet 65.

The wall 63 of the primary burner section 60 is a heavily insulated high temperature wall. This aids in facilitating the previously set forth combustion in the primary burner section 60. In the preferred embodiment disclosed, it is designed to maintain the temperature of approximately 1400°–2300° F. upon stabilization of the combustion within the reaction chamber 62. The wall 63 includes a cylindrical section 66 and the cylindrical outlet 65 interconnected by a tapering section 67.

The tapering section 67 provides a gradual contraction at the outlet of the primary combustion chamber insuring a complete burnout of the premix. The tapering section is also part of the later described flame modifying section. The tapering section 67 provides restriction in the flow of combusted chamber products. This creates a controlled region within the chamber in which chamber conditions are kept separate from furnace conditions. Recirculation and mixing is inhibited between the combusted chamber products and the furnace products. In this way, the tapered section 67 permits chamber temperature and environment to be maintained separately from the furnace.

The cylindrical reaction section 66 is the primary combustion area for the burner. This section accomplishes the combustion of the primary fuel oxidant mixture. Lean premix mixtures enter the chamber from the mixers and are initially pilot ignited. Stability of the flame is obtained primarily by recirculation of partially combusted gases back to the incoming non-combusted oxidant fuel mixture. The reaction chamber has a significant impact on the flame shaping and momentum. In the burner system disclosed, an intermediate flame length and intermediate velocity are created by the use of a small taper at the chamber exit. This also prevents the flow of any furnace gases back into the recirculation paths within the reaction chamber. The design parameters of the reaction chamber are cold flow space velocity (14 exchanges/sec), mean cold flow entrance velocity (15–20'/s), and hot flow exit velocity (180'/s). Other flame shapes can be provided by altering the reaction chamber design and most particularly the shape of the tapering section.

The particular cylindrical section 66 disclosed is approximately 8" in diameter and 10" in length. Reaction chamber dimensions will be adjusted to the change in volume flow for the calculated stoichiometry. Bypass passages and exit ports could also be changed. As set forth, the tapering section 67 serves to facilitate the recirculation 64 for the reaction chamber 62 as well as aiding in the shaping of the flame. This section 67 could be omitted if desired. In the preferred embodiment disclosed, the tapering section is approximately 4" in overall length and a 40° included angle taper. Due to the existence of the reduced diameter, the recirculation of gases at 2000°–2300° F. within the reaction chamber back to the discharge 46 of the mixer tubes 41 is facilitated. This high temperature recirculation (caused primarily by the off balance mixer section in the preferred embodiment) in combination with the pilot and the heat of the wall 63 serves to maintain the combustion within the reaction chamber. The outlet section 65 is approximately 6" in diameter and 1" in length. The outlet section 65 is the main output for the primary burner section 60. The air has a velocity of 35–400' per second, some 180' per second in the preferred embodiment through this outlet section 65. The pressure of the outlet 65 of the primary combustion chamber 60 is preferably from 0.5–4" water column.

The equivalence ratio in the burner chamber 64 is from 0.5 to 0.75 for natural gas and air combustion. The oxygen content is from 10 to 6.5%.

There is a slight flame in this outlet section 65 in the preferred embodiment disclosed. This flame facilitates ignition with the bypass gas (as later described). This flame could be eliminated or expanded as desired (along with the bypass gas). Note that in some unusual circumstances the burner chamber 60 might be utilized as a furnace.

Figure 4:
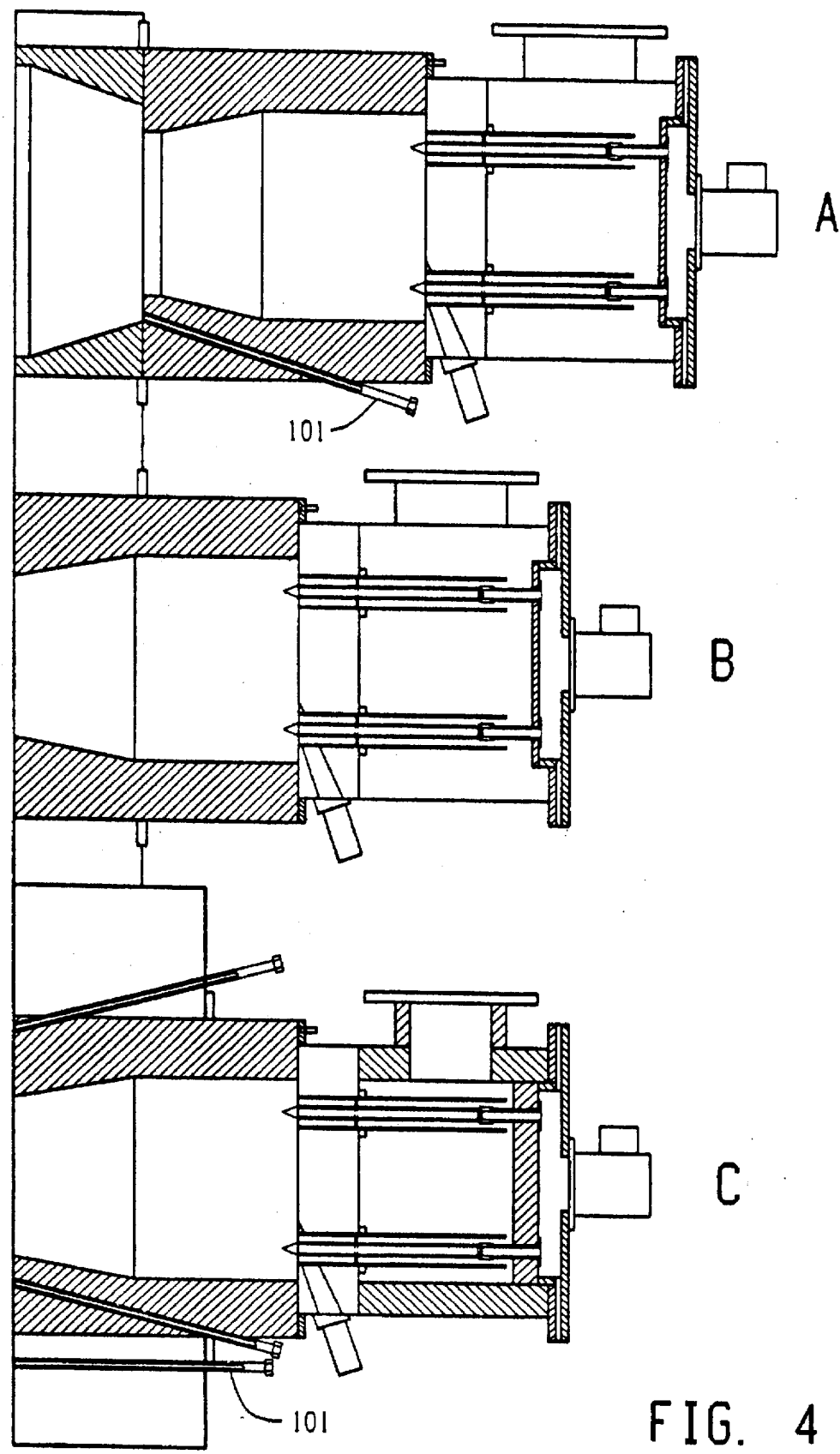
FIG. 4 is a series of longitudinal cross sectional views of modified burner systems like FIG. 1; and, FIGS. 5, 6, and 7 are longitudinal cross sectional views of further burner systems incorporating the invention.

The optional flame modifying section 90 for the burner system is designed to work in conjunction with the primary burner section 60 (most particularly the tapering section 67) in certain select applications to shape the flame of the bypass gas burning in the furnace 100. For example, the flame modifying section 90 shown is a burner tile 91 some 6" in length having a gradual taper. This burner tile guarantees burning in a cold furnace. (It would not be needed in a hot furnace like a glass or steel reheat furnace which could use a system like that in FIG. 4b.) The purpose for this particular flame modifying section is to clean up carbon monoxide output in a cold furnace application (it may reach 200 parts per million or more in a cold furnace while only 10 parts per million above 1400° F.). The flame modifying section 90 also aids in the recirculation within the furnace as later described.

In the preferred embodiment disclosed, there are a series of secondary bypass gas jets 101 located circumferentially surrounding the outlet 65 of the primary combustion chamber 62. These optional secondary gas jets are used to provide burning within the flame modifying section 90 of the burner and the secondary flame section 100 (later described). This type of combustion is desirable for example in boiler, process heater, and aluminum melting and holding burners.

The optional secondary flame section 100 is a location for secondary burning. The preferred embodiment uses entraining jets to draw furnace gases back to the burner, thus diluting combustion. This secondary burning occasions some NOX penalty, but this is compensated for by an increase in the heat liberated from the burner 60.

The secondary fuel combination section may consist of the final furnace tile and the bypass fuel jet exits. These two features serve three purposes in the combustion system; they increase the final heat liberation to normal industrial heating levels (2% $O_2$ in the flue gas), they define flame shape and aesthetic appearance, and they provide the final control of NOX and CO emissions. The preferred design utilizes jets well spaced from the reaction chamber, angled toward the centerline of the burner at 10°–15° and a short furnace tile section. This combination produces both NOX and CO emission levels below 20 ppm v (3% $O_2$ basis) in a 1600° F. chamber. The resultant flame shape is compact with a tight diameter and an axial heat release with ambient air of approximately 1 MMBTU/hr-ft.

In the preferred embodiment disclosed, the secondary flame section 100 is activated by a series of bypass fuel (gas) jets 101 which are located surrounding the outlet section 65 of the burner section 60. The bypass fuel jets 101 are fed through a series of tubes 102 from a secondary fuel plenum 103, a plenum fed from its own fuel input 105 in the preferred embodiment disclosed. The secondary fuel plenum serves to distribute the fuel stream uniformly between the individual bypass passages. This even distribution gives the visible flame balance and consistency through the flame envelope. This separate gas input 105 allows the individual control of the secondary flame section. These bypass gas jets 101 provide gas (from 40–700' per second and 300–600 cubic feet per hour in the preferred embodiment shown) in order to provide a medium temperature burning (in excess of 1200° F. in the preferred embodiment shown) within the furnace. They also entrain furnace gases to dilute the combustion process. This stages the burning of the fuel in the secondary flame section. This eliminates flame quenching and reduces carbon monoxide generation (also providing a 3' flame into the furnace in the preferred embodiment). The furnace recirculation 94 aids in this secondary flame burning. In the preferred embodiment disclosed, the NOX is substantially 18 ppm, 7 ppm carbon monoxide for 1600° F. furnace temperature, and a 2,500,000 BTU burner. It is preferred that the distance, angle and velocity of the bypass gas jets 101 be selected such that the burning of the gas bypass is complete at a temperature above 1400° F. With lower furnace temperatures, this will necessitate a closer location of the gas jets 101 to the outlet 65 than in a furnace having a temperature above this 1400° F. In certain situations such as those able to take direct burner output (for example, the 8% $O_2$), the secondary jets may be eliminated and no bypass gas would be utilized. For example, aggregate dryers typically run at approximately 7% $O_2$ dry in the products of combustion. To obtain the lowest possible NOX emissions, no bypass gas will be utilized. Additionally, some manufacturers use an extra combustion chamber to complete combustion, minimizing carbon monoxide emissions due to flame quenching by the drying process. In these applications, no reaction chamber/bypass gas section will be required. The primary burner element will mount directly to the combustion chamber, using it as the reaction chamber.

Combustion product gases may be recirculated to either of two locations. If it is included with the combustion air, a decrease in primary zone adiabatic flame temperature will result. This must be offset by a corresponding increase in primary zone equivalence ratio. Also the reaction chamber and bypass gas port dimensions may have to be changed to accommodate the difference in flow rates. The second option for the addition of product gases is through the bypass gas ports. If this method is used, changes must be made to the bypass gas supply passages and exit ports.

In addition to providing reduced levels of NOX emissions, the present invention also provides a significantly higher level of safety. Numerous factors contribute to the improved safety levels, including the flashback control, the relatively small capacity of each mixing tube in the burner, and the small volume of fuel and oxidant mix between the mixing site and the combustion site within each tube. These advantages and others provide significant advantages over prior burner systems.

Although the invention has been described in its preferred form with a certain degree of particularity, it is to be realized that numerous changes may be made without deviating from the invention as herein after claimed.

As an example, although a particular design of mixing tube 41 is disclosed for the mixing section 40, other means of uniformly intermixing the fuel and combustion air could be utilized instead.

As an additional example, although the primary burner section 60 is disclosed having a tapered section 67 interconnecting the cylindrical section 66 and the outlet 65, and the flame modifying section 90 has a tapering section 91, other types of reduction in diameters could be utilized including an abrupt transition. Other modifications are also possible to suit various application.

What is claimed:

1. A burner system for safely combusting fuel with oxidant in order to control flashback, said burner system comprising:

a reaction chamber for substantially combusting a fuel and oxidant mixture, said reaction chamber further comprising:

a plurality of inlets for receiving the mixture;

a burner axis; and an outlet for discharging the substantially combusted mixture into a furnace; said burner system further comprising:

a plurality of mixer elements for mixing fuel and oxidant in a predetermined proportion in order to produce the mixture, said mixer elements comprising:

a mixer inlet for each of the plurality of mixer elements wherein fuel and oxidant are admitted into each mixer inlet;

a mixer outlet for each of the plurality of mixer elements, wherein each mixer outlet is connected to a respective reaction chamber inlet, wherein combustion occurs substantially proximate to the mixer outlet, wherein each mixer outlet is located off-center a significant distance from the burner axis so as to provide a flow imbalance in the reaction chamber in order to recirculate part of the substantially combusted mixture within said reaction chamber toward each mixer outlet, wherein the remainder of said substantially combusted mixture is discharged out of the outlet of said reaction chamber; wherein said burner system further comprising:

at least one fuel plenum for commonly supplying fuel to each of the plurality of mixer inlets; and at least one oxidant plenum for commonly supplying oxidant to each of the plurality of mixer inlets.

2. The burner system of claim 1 wherein each of said mixer elements have an annular cross section with an effective diameter whereby flashback is inhibited.

3. The burner system of claim 1 further comprising secondary bypass jets, located in the vicinity of the outlet of the reaction chamber, for providing secondary fuel to the substantially combusted fuel and oxidant mixture passing out of the outlet.

4. The burner system of claim 3 wherein the bypass jets are configured to induce furnace product gases into the secondary fuel.

5. The burner system of claim 3 wherein the secondary fuel from the secondary bypass gas jets has a flow velocity of 40-700 feet per second.

6. The burner system of claim 1 further comprising a flame modifying section, located between the outlet of the reaction chamber and the furnace, wherein the shape of the flame within the furnace is modified.

7. The burner system of claim 1 wherein the reaction chamber has chamber walls having insulation and thermal mass sufficiently high so that chamber temperature is maintained at a temperature sufficient to produce auto-ignition of the mixed fuel and oxidant.

8. The burner system of claim 1 further comprising an ignition arrangement including a pilot burner.

9. The burner system of claim 1 wherein the oxidant is air.

10. The burner system of claim 1 wherein the oxidant is air enriched with oxygen up to 50% $O_2$.

11. The burner system of claim 1 wherein the oxidant temperature is elevated by a preheater.

12. The burner system of claim 1 wherein the oxidant is a reduced oxygen vitiated air stream.

13. The burner system of claim 1 wherein the fuel is natural gas.

14. The burner system of claim 1 wherein the fuel is a gaseous hydrocarbon fuel.

15. The burner system of claim 1 wherein said chamber outlet has a diameter smaller than an interior diameter of the reaction chamber, and has a substantially tapered section from the chamber interior diameter to the outlet, wherein said tapered section prevents mixing between the substantially combusted chamber products and the furnace products.

16. The burner system of claim 1 wherein the predetermined proportion of mixed air and natural gas has an equivalence ratio between the flammability limit and the stoichiometric ratio.

17. The burner system of claim 16 wherein said fuel is natural gas and said oxidant is air, wherein the predetermined proportion of mixed air and natural gas at ambient temperature has a 0.53 to 0.795 equivalence ratio.

* * * * *